US012654241B2

(12) United States Patent
Semnisky et al.

(10) Patent No.: US 12,654,241 B2
(45) Date of Patent: Jun. 16, 2026

(54) ROTARY CUTTING TOOL WITH SUPPORT STRUCTURE

(71) Applicant: Kennametal Inc., Latrobe, PA (US)

(72) Inventors: Logan M. Semnisky, Greensburg, PA (US); Alan J. Bookheimer, Greensburg, PA (US); Ingo Grillenberger, Neuendettelsau (DE)

(73) Assignee: KENNAMETAL INC., Latrobe, PA (US)

( * ) Notice: Subject to any disclaimer, the term of this patent is extended or adjusted under 35 U.S.C. 154(b) by 656 days.

(21) Appl. No.: 17/674,382

(22) Filed: Feb. 17, 2022

(65) Prior Publication Data

US 2023/0256520 A1    Aug. 17, 2023

(51) Int. Cl.
  *B23C 5/00*        (2006.01)
  *B23C 5/22*        (2006.01)

(52) U.S. Cl.
  CPC .............. B23C 5/006 (2013.01); B23C 5/22 (2013.01); *B23B 2250/04* (2013.01); *B23B 2250/12* (2013.01); *B23C 2210/246* (2013.01)

(58) Field of Classification Search
  CPC .............. B23B 29/034; B23B 2229/00; B23B 2250/04; B23B 2250/12; B33Y 80/00
  See application file for complete search history.

(56) References Cited

U.S. PATENT DOCUMENTS 2,828,529 A    4/1958 Bryant
4,690,461 A    9/1987 Rink
5,135,337 A    8/1992 Adamson
5,152,640 A    10/1992 Regis et al.
5,605,420 A    2/1997 Feldsine
5,921,727 A    7/1999 Depperman
5,934,842 A    8/1999 Gupta
        (Continued)

FOREIGN PATENT DOCUMENTS

CA    3189042 A1    9/2023
CN    102089103 A    6/2011
        (Continued)

OTHER PUBLICATIONS

Apr. 12, 2022 International Search Report WO App. No. PCT/US2021/062367.
        (Continued)

*Primary Examiner* — Nicole N Ramos
(74) *Attorney, Agent, or Firm* — John A. Wilaj, Jr.

(57)        ABSTRACT

A rotary cutting tool includes a support structure having a central hub located at an axially rearward end of the rotary cutting tool. A plurality of primary support members extends from the central hub in different axial and radial directions in three-dimensional space with respect to a central, rotational axis of the rotary cutting tool. The support structure may include one or more secondary support members extending from a primary support member in different axial and radial directions in three-dimensional space, and one or more tertiary support members to increase stiffness of the support structure. The central hub extends in a plane that is substantially perpendicular to the central, rotational axis of the rotary cutting tool. In one embodiment, each of the plurality of primary support members have a different physical dimension.

19 Claims, 7 Drawing Sheets

(56)                References Cited

U.S. PATENT DOCUMENTS

| | | | |
|---|---|---|---|
| 6,120,218 A | 9/2000 | Bishop | |
| 6,655,883 B2 | 12/2003 | Maar | |
| 6,890,132 B1 | 5/2005 | Baron et al. | |
| 6,913,428 B2 | 7/2005 | Kress | |
| 8,545,134 B2 | 10/2013 | Frank | |
| 8,764,354 B2 | 7/2014 | Schuffenhauer et al. | |
| 8,950,985 B2 | 2/2015 | Durand-Terrasson | |
| 9,004,822 B2 | 4/2015 | Francis et al. | |
| 9,056,357 B2 | 6/2015 | Bozkurt | |
| 9,216,461 B2 | 12/2015 | Athad | |
| 9,283,624 B2 | 3/2016 | Freyermuth et al. | |
| 9,573,199 B2 | 2/2017 | Baratta | |
| 9,623,494 B2 | 4/2017 | Bozkurt | |
| 10,449,609 B2 | 10/2019 | Baratta | |
| 10,464,138 B2 | 11/2019 | Kozaki et al. | |
| 10,799,960 B2 | 10/2020 | Zetek et al. | |
| 10,940,551 B1 | 3/2021 | Semnisky et al. | |
| 11,203,073 B2 | 12/2021 | Parendo et al. | |
| 11,203,074 B2 | 12/2021 | Bek et al. | |
| 11,504,784 B2 | 11/2022 | Semnisky et al. | |
| 11,534,841 B2 | 12/2022 | Maksimovic et al. | |
| 11,571,759 B2 | 2/2023 | Semnisky et al. | |
| 2005/0019110 A1 | 1/2005 | Astrakhan | |
| 2010/0139469 A1 | 6/2010 | Matteucci | |
| 2010/0150673 A1 | 6/2010 | Schneider et al. | |
| 2010/0158623 A1 | 6/2010 | Danielsson | |
| 2010/0247255 A1 | 9/2010 | Nitzsche et al. | |
| 2011/0182676 A1 | 7/2011 | Frank et al. | |
| 2011/0182677 A1* | 7/2011 | Frank | B23C 5/006 |
| | | | 407/46 |
| 2011/0188954 A1 | 8/2011 | Frank | |
| 2012/0251254 A1 | 10/2012 | Durand-Terrasson | |
| 2013/0136551 A1 | 5/2013 | Nisikawa | |
| 2013/0156520 A1 | 6/2013 | Hacker et al. | |
| 2014/0161543 A1* | 6/2014 | Francis | B23C 5/006 |
| | | | 407/115 |
| 2014/0227047 A1 | 8/2014 | Dettle et al. | |
| 2014/0334892 A1 | 11/2014 | Baratta | |
| 2015/0328696 A1 | 11/2015 | Wang et al. | |
| 2017/0151614 A1 | 6/2017 | Woodruff et al. | |
| 2017/0252839 A1 | 9/2017 | Donisi et al. | |
| 2019/0099816 A1* | 4/2019 | Zetek | B23C 5/006 |
| 2019/0314903 A1* | 10/2019 | Haenle | B23C 5/04 |
| 2019/0314904 A1 | 10/2019 | Haenle | |
| 2020/0055128 A1 | 2/2020 | Lehto | |
| 2020/0055129 A1 | 2/2020 | Leuze et al. | |
| 2020/0086404 A1 | 3/2020 | Schmid et al. | |
| 2020/0230716 A1 | 7/2020 | Henry et al. | |
| 2021/0060665 A1* | 3/2021 | Semnisky | B23D 77/02 |
| 2022/0023960 A1 | 1/2022 | Ljatifi et al. | |
| 2022/0176473 A1 | 6/2022 | Semnisky et al. | |
| 2022/0176474 A1 | 6/2022 | Munoz et al. | |
| 2022/0176480 A1 | 6/2022 | Semnisky et al. | |
| 2023/0016177 A1 | 1/2023 | Bookheimer et al. | |

FOREIGN PATENT DOCUMENTS

| | | | |
|---|---|---|---|
| CN | 102438782 A | 5/2012 | |
| CN | 202845872 U | 4/2013 | |
| CN | 105252059 A | 1/2016 | |
| CN | 205967563 U | 2/2017 | |
| CN | 108213535 A | 6/2018 | |
| CN | 109070245 A | 12/2018 | |
| CN | 209139934 U | 7/2019 | |
| DE | 3423279 A1 | 1/1986 | |
| DE | 19934125 | 1/2001 | |
| DE | 10305991 A1 | 12/2004 | |
| DE | 10359854 A1 | 7/2005 | |
| DE | 102005059703 B3 | 12/2006 | |
| DE | 102007007399 A1 | 8/2008 | |
| DE | 102009022051 B3 | 9/2010 | |
| DE | 102011016921 A1 | 10/2012 | |
| DE | 102016104005 A1 | 9/2017 | |
| DE | 102017118604 A1 | 2/2018 | |
| DE | 102011055210 B4 | 5/2020 | |
| DE | 102020011782 A1 | 5/2021 | |
| EP | 0074542 A2 | 3/1983 | |
| EP | 0074542 A3 | 6/1984 | |
| EP | 1 984 135 B1 | 10/2008 | |
| EP | 1984135 A1 | 10/2008 | |
| EP | 2301702 A1 | 3/2011 | |
| EP | 2974817 A1 | 1/2016 | |
| EP | 3072615 A1 | 9/2016 | |
| EP | 3771561 A1 | 2/2021 | |
| EP | 3772384 A1 | 2/2021 | |
| EP | 3785835 A1 | 3/2021 | |
| EP | 3819055 A1 | 5/2021 | |
| EP | 4008459 A1 | 6/2022 | |
| EP | 4249155 A1 | 9/2023 | |
| EP | 4259366 A1 | 10/2023 | |
| EP | 4259378 A1 | 10/2023 | |
| FR | 2927555 A3 | 8/2009 | |
| FR | 2967366 A1 | 5/2012 | |
| GB | 605359 A | 7/1948 | |
| IN | 18/2023 | 5/2023 | |
| IT | 20110346 A1 | 12/2012 | |
| JP | H11235615 A | 8/1999 | |
| JP | 2006015444 A | 1/2006 | |
| JP | 2006150535 A | 6/2006 | |
| JP | 4654622 B2 | 3/2011 | |
| JP | 2011167834 A | 9/2011 | |
| JP | 2017030075 A | 2/2017 | |
| JP | 2018149655 A | 9/2018 | |
| JP | 2018149656 A | 9/2018 | |
| JP | 2019511385 A | 4/2019 | |
| WO | WO1987004969 A1 | 8/1987 | |
| WO | 2010/020234 A1 | 8/2009 | |
| WO | WO2010097082 A1 | 9/2010 | |
| WO | WO2012101319 A1 | 8/2012 | |
| WO | 2017083192 A1 | 5/2017 | |
| WO | 2017177990 A2 | 10/2017 | |
| WO | WO2019002050 A1 | 1/2019 | |
| WO | WO2020118460 A1 | 6/2020 | |
| WO | WO2021023489 A1 | 2/2021 | |
| WO | 2022105953 A2 | 5/2022 | |

OTHER PUBLICATIONS

Mar. 30, 2022 International Search Report WO App. No. PCT/US2021/062322.

Jun. 6, 2022 Office action (3 months) (US Only) U.S. Appl. No. 17/115,997.

Apr. 13, 2022 Office action (3 months) (US Only) U.S. Appl. No. 17/116,782.

Sep. 16, 2023 Foreign Office Action Chinese Application No. CN202180081345, 2 Pages.

Sep. 16, 2023 Foreign Office Action Chinese Application No. CN202180083118, 2 Pages.

International Preliminary Report on Patentability for International Application No. PCT/US2021/062322, mailed Jun. 22, 2023, 8 Pages.

International Preliminary Report on Patentability for International Application No. PCT/US2021/062367, mailed Jun. 22, 2023, 7 Pages.

Sep. 7, 2023 Notice of Allowance U.S. Appl. No. 17/374,263, 8 Pages.

Aug. 18, 2023 Foreign Office Action European Application No. EP20200190517, 38 Pages.

Aug. 22, 2023 Final Office Action U.S. Appl. No. 17/374,263, Aug. 22, 2023, 7 Pages.

Oct. 5, 2023 Non-Final Office Action U.S. Appl. No. 17/702,399, 8 Pages.

May 25, 2024 Foreign Office Action Chinese Application No. CN202210790670.2, 2 pages.

Nov. 2, 2023 Foreign Office Action Chinese Application No. CN202010751992.7, 8 Pages.

Jun. 28, 2023 Non-Final Office Action U.S. Appl. No. 17/374,263, 12 Pages.

Sep. 28, 2023 Notice of Allowance for U.S. Appl. No. 17/374,263, 2 Pages.

(56) References Cited

OTHER PUBLICATIONS

Sep. 29, 2022 Notice of Allowance US App. No. 20220176480.
Aug. 24, 2022 Advisory Action (PTOL-303) 1 US App. No. 20220176480.
Jul. 27, 2022 Final Office Action (US Only) US App. No. 20220176480.
Jul. 21, 2022 Notice of Allowance US App. No. 20220176473.
Apr. 15, 2023 Foreign Office Action Chinese Application No. CN202010751992.7, 20 Pages.
International Search Report and Written Opinion for International Application No. PCT/US2023/011419, mailed May 22, 2023, 8 Pages.
Extended European Search Report for European Application No. 23163767.9, mailed Jul. 8, 2023, 38 Pages.
Jan. 29, 2021 Search report EP App. No. 20190517.1.
Nov. 5, 2020 Notice of Allowance US No. 16557533.
Jun. 6, 2024 Non-Final Office Action U.S. Appl. No. 29/847,592, 7 Pages.
Special Light Milling Head Produced by 3D Metal Printing, Regional Technological Institute, Faculty of Mechanical Engineering, University of West Bohemia, Univerzitni 8, 306, 14 Plzen, Czech Republic.
Oct. 26, 2023 Notice of Allowance for U.S. Appl. No. 17/702,399, 7 Pages.
Oct. 27, 2023 Notice of Allowance for U.S. Appl. No. 17/374,263, 2 Pages.
Jan. 31, 2024 Foreign Office Action Chinese Application No. CN202010751992.7, 7 Pages.
Jul. 15, 2024 Non Final Rejection U.S. Appl. No. 18/083,299, 18 Pages.
Nov. 23, 2024 Foreign Office Action Chinese Application No. CN20238021343, 2 Pages
Dec. 25, 2024 Foreign Office Action Chinese Application No. CN2024600001984, 03 Pages.
Feb. 10, 2025 Final Rejection U.S. Appl. No. 18/083,299, 12 Pages.

Apr. 2, 2025 Foreign Office Action European Application No. EP237567581.1, 03 Pages
May 27, 2025 Notice of Allowance for U.S. Appl. No. 18/083,299, 10 Pages.
Jun. 24, 2025 Foreign Office Action Japanese Patent Application No. JP2023534726, 04 Pages.
Jul. 1, 2025 Foreign Office Action Japanese Patent Application No. JP2023534723, 04 Pages.
Oct. 14, 2025 Foreign Office Action Japanese Patent Application No. JP2023534723, 02 Pages.
Dec. 2, 2025 Foreign Office Action Japanese Patent Application No. JP2023534726, 02 Pages.
BVV I-Katalog: "Gold Medal MSV 2018—Awarded Exhibits," MSV, International Engineering Fair, 2018, 26 Pages, Retrieved from [https://www.ibvv.cz/en/MSV2018_zlata-medaile-msv-2018-ocenene-exponaty].
European Office Communication for Application No. EP237567581, mailed on Sep. 10, 2024, 03 pages.
Extended European Search Report for European Application No. 20210904313, mailed Oct. 1, 2024, 14 Pages.
Extended European Search Report for European Application No. 210904297, mailed Oct. 18, 2024, 11 Pages.
Extended European Search Report for European Application No. 237567581, mailed Dec. 22, 2025, 09 Pages.
International Preliminary Report on Patentability for International Application No. PCT/US2023/011419, mailed Aug. 29, 2024, 07 Pages.
Kraken, "New generation of the milling head produced by 3D metal printing 1," 2018, https://www.youtube.com/watch? V=-4lzvMqrpmU.
Machine Translation of DE102011055210 (Pub No. DE102011055210B4), 2020, 16 Pages.
Jan. 1, 2026 Foreign Office Action Chinese Application No. CN202180083118, 26 Pages.
Jan. 27, 2026 Foreign Office Action Chinese Application No. CN202180081345, 24 Pages.

* cited by examiner

ROTARY CUTTING TOOL WITH SUPPORT STRUCTURE

FIELD OF THE DISCLOSURE

In general, the invention relates to cutting tools, and more particularly, to a lightweight rotary cutting tool, such as a rotating boring tool, and the like, comprising a support structure having a plurality of support members with a geometric arrangement and physical dimensions that are determined using a topology optimization technique and is manufactured using additive manufacturing.

BACKGROUND OF THE DISCLOSURE

In certain machining applications, the weight of the cutting tool can become a significant constraint. Heavy tools are problematic for operators who must handle the tools. In addition, the time to accelerate and decelerate the tool to its desired speed decreases with reduced tool weight and moment of inertia. Further, large heavy tools become difficult or impractical to move by hand, thereby requiring the use of automatic tool changers. Even further, heavy cutting tools can cause issues with tool change efficiency or even result in poor machining quality if the tilting moment of the tool is too high for the machine connection. Thus, there is a need to minimize the weight of heavy conventional cutting tools, while retaining adequate stiffness, to allow for easier handling and reduced operating costs.

SUMMARY OF THE DISCLOSURE

The problem of reducing the weight of a rotary cutting tool, such as a reamer, and the like, is solved by using a topology optimization technique combined with additive manufacturing (i.e., 3D printing) to produce a support structure that drastically reduces the overall weight of the rotary cutting tool, while maintaining the strength, stiffness, and functionality of the rotary cutting tool.

Topology optimization uses a finite element analysis (FEA) or a finite element method (FEM) to optimize the distribution of material in a structure for a given volume based on the applied loads and constraints. The current proliferation of 3D printer technology has allowed designers and engineers to use topology optimization techniques when designing new products. Topology optimization combined with 3D printing can result in lightweight, improved structural performance and shortened design-to-manufacturing cycle.

The geometric arrangement and physical dimensions of each support member of the support structure of the rotary cutting tool is determined using a topology optimization technique to provide a support structure having the highest possible stiffness to weight ratio for the given material, volume, and loads/constraints. The support structure of the invention has a complex geometry that can be combined with 3D printing, thereby resulting in a lightweight structure with improved structural performance.

In one aspect, a rotary cutting tool comprises a support structure comprising a central hub located at an axially rearward end of the rotary cutting tool and a plurality of support members extending in different axial and radial directions in three-dimensional space with respect to a central, rotational axis of the rotary cutting tool. A pocket region is supported by one of the plurality of support members. The rotary cutting tool further comprises and an adapter connected to the central hub for connecting the support structure to a rear machine connection member, wherein the central hub extends in a plane that is substantially perpendicular to the central, rotational axis of the rotary cutting tool.

In another aspect, a support structure for a rotary cutting tool comprises a central hub located at an axially rearward end of the rotary cutting tool. A plurality of support members extend in different axial and radial directions in three-dimensional space with respect to a central, rotational axis of the rotary cutting tool. A pocket region is supported by one of the plurality of support members, wherein each of the plurality of support members have a different physical dimension.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE DISCLOSURE

Figure 1:
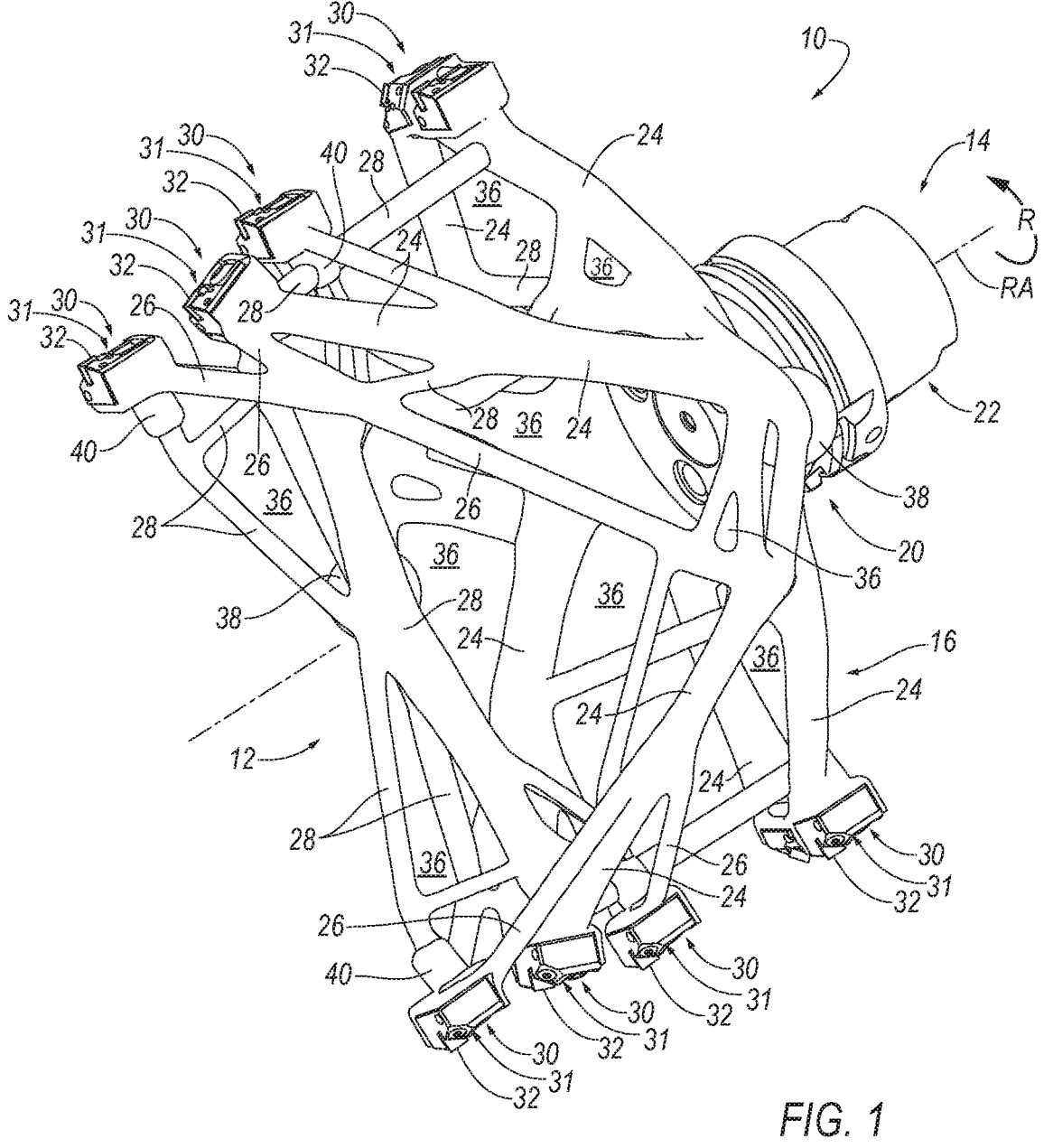
FIG. 1 is a front perspective view of a rotary cutting tool, such as a rotating boring tool, according to an embodiment of the disclosure.
Figure 2:
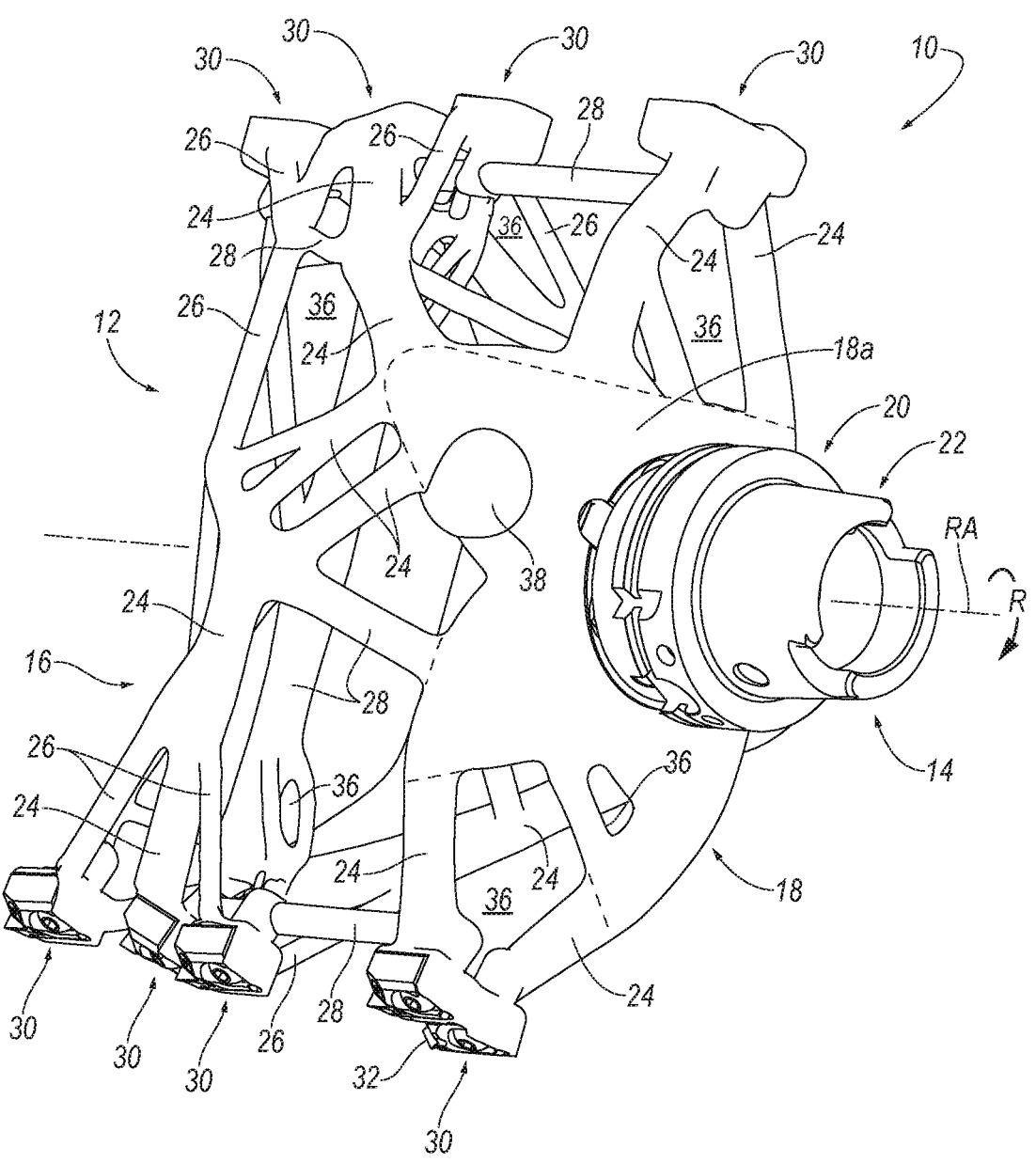
FIG. 2 is a rear perspective view of the rotary cutting tool of FIG. 1.

Referring now to FIGS. 1-5, a rotary cutting tool 10 is shown according to an embodiment of the invention. In the illustrated embodiment, the rotary cutting tool 10 comprises a rotating boring tool that rotates in the direction, R, about a central, rotational axis, RA, during operation. Although the rotary cutting tool 10 comprises a rotating boring tool in the illustrated embodiment, it should be appreciated that the principles of the invention can be applied to any cutting tool for metal cutting operations, such as a milling cutter, reamer, and the like. In addition, the description herein of specific applications should not be a limitation on the scope and extent of the use of the rotary cutting tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "3D printing" or "additive manufacturing" is the construction of a three-dimensional object from a CAD model or a digital 3D model. The term "3D printing" can refer to a variety of processes in which material is deposited, joined or solidified under computer control to create a three-dimensional object, with material being added together, such as liquid molecules or powder grains being fused together, typically layer by layer.

As used herein, the term "topology" is defined as the way in which constituent parts are interrelated or arranged.

As used herein, the phrase "topology optimization" is defined as a mathematical method that optimizes material layout within a given design space, for a given set of loads, boundary conditions and constraints with the goal of maximizing the performance of the system. Topology optimization is different from shape optimization and sizing optimization in the sense that the design can attain any shape within the design space, instead of dealing with predefined configurations. The conventional topology optimization technique uses a finite element analysis (FEA) or a finite element method (FEM) to evaluate the design performance. The design is optimized using either gradient-based mathematical programming techniques, such as the optimality criteria algorithm and the method of moving asymptotes or non-gradient-based algorithms, such as genetic algorithms. There are a variety of commercially available software programs for topology optimization including, but not limited to, Ansys Mechanical, Altair Inspire, Siemens NX, and Solidworks.

As used herein, the phrase "physical dimension" of a support member is defined as length and cross-sectional area of the support member.

As used herein, the term "cantilever" is defined as a rigid structural element that extends horizontally and is supported at only one end.

As used herein, the term "void" is defined as a completely empty space.

In general, the rotary cutting tool 10 comprises an axially forward end 12 and an axially rearward end 14. A support structure, shown generally at 16, comprises a central hub 18 located proximate an adapter 20 for attaching the support structure 16 to a rear machine connection member 22 at the axially rearward end 14 of the rotary cutting tool 10.

Figure 4:
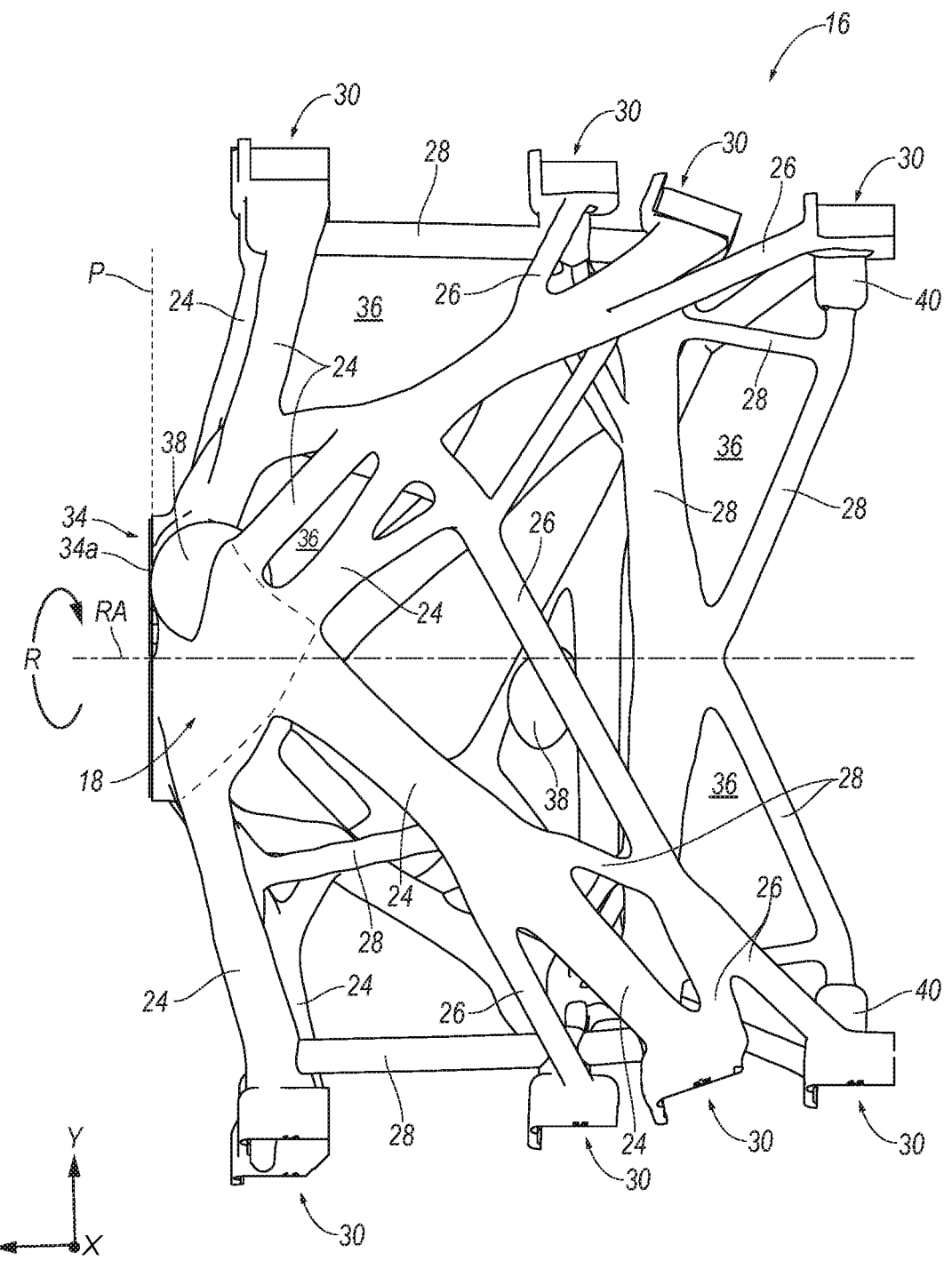
FIG. 4 is another side view of a support structure of the rotary cutting tool of FIG. 1.

As shown in FIG. 4, the central hub 18 extends in a plane, P, that is substantially perpendicular to the central, rotational axis, RA, of the rotary cutting tool 10. In addition, the central hub 18 has an asymmetric, non-circular cross-sectional shape, as indicated by the dashed lines in FIGS. 2 and 5. In the illustrated embodiment, for example, the central hub 18 is substantially star shaped.

In the illustrated embodiment, the support structure 16 comprises three different types of support members:
1) a primary support member 24;
2) a secondary support member 26; and
3) a tertiary support member 28.

The number and size of the tertiary support members 28 depend on the centrifugal and cutting forces exerted on the support structure 16 during use and can be provided to prevent deflection of the support structure 16 during a cutting operation. It should be noted that the secondary support members 26 and/or the tertiary support members 28 may not be needed and can be omitted from the support structure 16, depending on the centrifugal and cutting forces exerted on the support structure 16.

In general, the primary support member 24 extends from the central hub 18 to either a secondary support member 26 or to a pocket region 30. In the illustrated embodiment, the support structure 16 has a plurality of primary support members 24 extending axially and radially outward from the central hub 18 in different directions in three-dimensional space. Generally, the primary support member 24 has a larger cross-sectional area (i.e., thickness) than either the secondary support member 26 or the tertiary support member 28. However, some tertiary support members 28 can have a larger cross-sectional area than the primary support member 24 and/or the secondary support member 26. In addition, the cross-sectional area of each of the primary support members 24 varies along its length. Further, each of the primary support members 24 have different physical dimensions, such as length, thickness, and the like.

In general, the secondary support member 26 extends from either a primary support member 24 to the pocket region 30 or from another secondary support member 26 to the pocket region 30. In the illustrated embodiment, the support structure 16 has a plurality of secondary support members 26 extending in different directions in three-dimensional space. Typically, the secondary support member 26 has a smaller cross-sectional area (i.e., thickness) than the primary support member 24, but may not necessarily have a larger cross-sectional area than the tertiary support member 28. In addition, the cross-sectional area of each of the secondary support members 26 varies along its length. Further, each of the secondary support members 26 have different physical dimensions, such as length, thickness, and the like.

As mentioned above, the cross-sectional area of each of the plurality of primary support members 24 is generally greater than a cross-sectional area of each of the plurality of secondary support members 26. It is noted that the size of the primary support members 24 depend on the forces exerted on the pocket region 30 during a cutting operation. Specifically, the higher the forces exerted on the pocket region 30, the larger the cross-sectional area of the corresponding support member 24, 26. Thus, it is possible that one or more of the secondary support members 26 can have a greater cross-sectional area than one or more of the primary support members 24.

In general, the tertiary support member 28 extends from a primary support member 24 to another primary support member 24, a primary support member 24 to a secondary support member 26, a secondary support member 26 to another secondary support member 26, or from a pocket region 30 to another pocket region 30. In addition, the tertiary support member 28 can extend from a primary support member 24 to the central hub 18, another tertiary support member 28 to the pocket region 30, and one tertiary support member 28 to another tertiary support member 28. In the illustrated embodiment, the support structure 16 has a plurality of tertiary support members 28 extending in different directions in three-dimensional space. In general, the cross-sectional area (i.e., thickness) of the tertiary support member 28 depends on the amount of support necessary for that particular region of the support structure 16. The larger the forces exerted on the support structure 16, the larger the cross-sectional area of the tertiary support member 28, and vice versa. In addition, the cross-sectional area of each of the tertiary support members 28 varies along its length. Further, each of the tertiary support members 28 have different physical dimensions, such as length, thickness, and the like.

It will be appreciated that the invention is not limited to the support structure 16 having all three different types of support members 24, 26, 28, and that the invention can be practiced with a support structure 16 having any number of different types of support members 24, 26, 28. For example, the support structure 16 may comprise only a plurality of primary support members 24, depending on the design requirements of the support structure 16. In another example, the support structure 16 may comprise only of a plurality of primary support members 24 and one or more secondary support members 24, depending on the design requirements of the support structure 16. However, in every embodiment, the support structure 16 will include at least one primary support member 24 extending from the central hub 18.

As mentioned above, each of the primary, secondary and tertiary support members 24, 26, 28 generally have different physical dimensions and extend in different directions in three-dimensional space. As a result, the support structure 16 is asymmetric with respect to the central, rotational axis, RA, of the rotary cutting tool 10. The support structure 16 may include one or more balancing masses 38 to rotationally balance the support structure 16 about the central, rotational axis, RA, if necessary. However, it should be appreciated that the support structure 16 can be substantially symmetric about the central, rotational axis, RA, of the rotary cutting tool 10, depending on the above-mentioned design requirements. If so, the balancing masses 38 are not necessary and can be omitted. It is also possible that an asymmetric support structure 16 can be rotationally balanced, in which case, the balancing masses 38 can be omitted.

Figure 3:
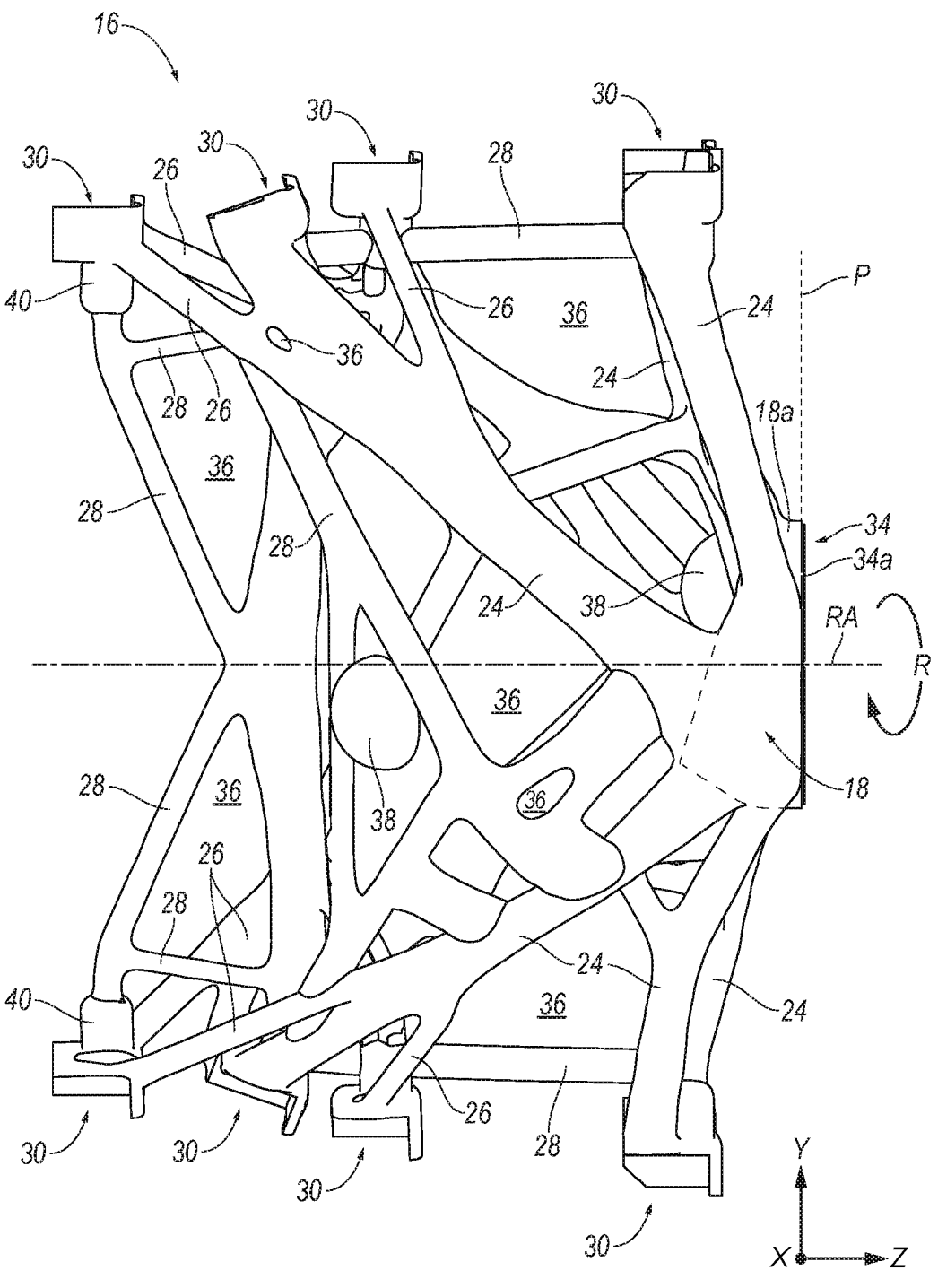
FIG. 3 is a side view of a support structure of the rotary cutting tool of FIG. 1.

As mentioned above, the support structure 16 includes a plurality of pocket regions 30 that are supported by the support structure 16. It should be understood that each pocket region 30 can support a cutting member, such as an insert-receiving cartridge with a cutting insert mounted therein, a cutting insert mounted in an insert-receiving pocket, and the like. In the illustrated embodiment, for example, each pocket region 30 receives an insert-receiving cartridge 31 with a cutting insert 32 mounted therein, as shown in FIG. 1. Alternatively, the cutting inserts 32 can be mounted directly to an insert-receiving pocket of a type known in the art. Because the primary and secondary support members 24, 26 extend radially outward at different axial locations in three-dimensional space, the pocket regions 30 are cantilevered from the central hub 18 at different axial and radial locations in three-dimensional space with respect to the central, rotational axis, RA. In the illustrated embodiment, the pocket region 30 may include an optional boss 40 to provide sufficient material for securing the cutting member to the pocket region 30, as shown in FIGS. 1, 3 and 4. Because each of the primary and second support arms 24, 26 extend differently in three-dimensional space (i.e., in the x-, y- and z-directions), each of the pocket regions 30 are located in three-dimensional space at a different location with respect to the central hub 18 of the rotary cutting tool 10.

Figure 5:
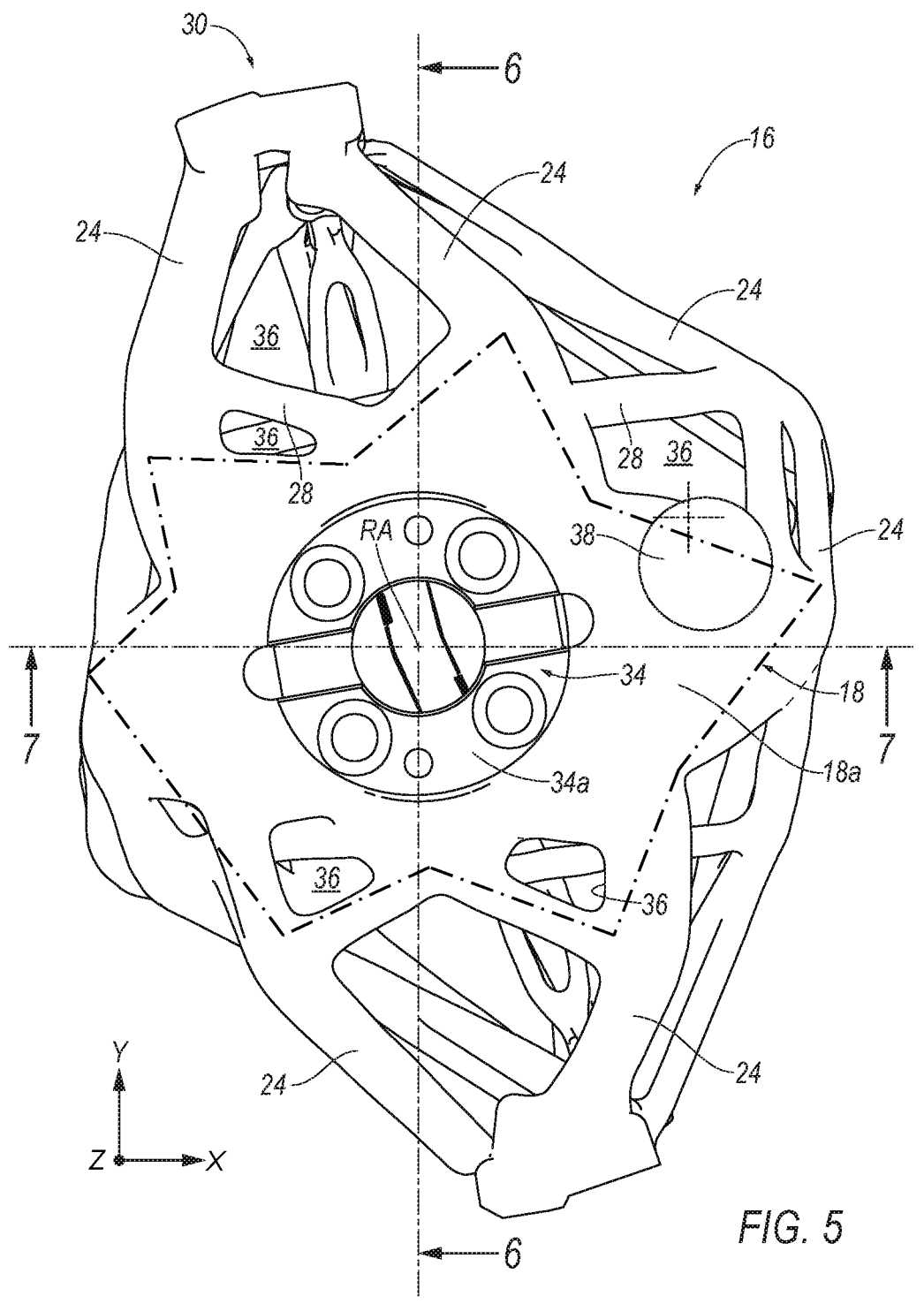
FIG. 5 is a rear view of the support structure of the rotary cutting tool of FIG. 1.

As shown in FIGS. 3-5, the central hub 18 has an outer surface 18a facing the rear of the rotary cutting tool 10 that is substantially non-planar. In order to adequately couple the support structure 16 to the adapter 20, the support structure 16 also includes a coupling interface 34 with a substantially planar outer surface 34a. In the illustrated embodiment, the coupling interface 34 can be integrally formed with the support structure 16 using additive manufacturing (i.e., 3D printing).

The support structure 16 also includes one or more voids 36 between each of the primary support members 24, secondary support members 26 and tertiary support members 28. Some voids 36 extend completely through the central hub 18. The voids 36 reduce the overall weight of the rotary cutting tool 10, while the support members 24, 26, 28 maintain the stiffness of the rotary cutting tool 10, thereby significantly increasing the stiffness-to-weight ratio of the rotary cutting tool 10.

Figure 6:
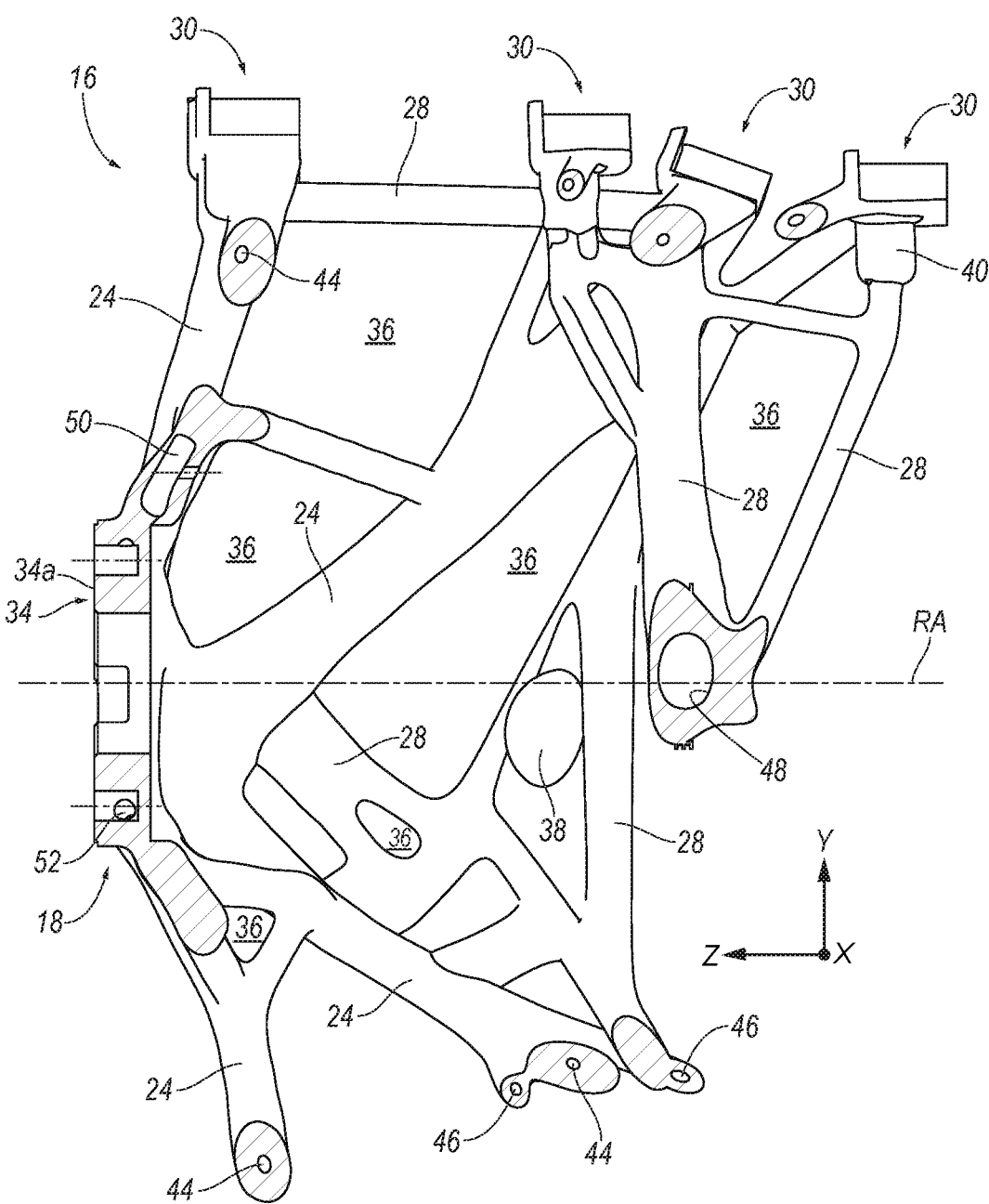
FIG. 6 is a cross-sectional view of the support structure taken along line 6-6 of FIG. 5.
Figure 7:
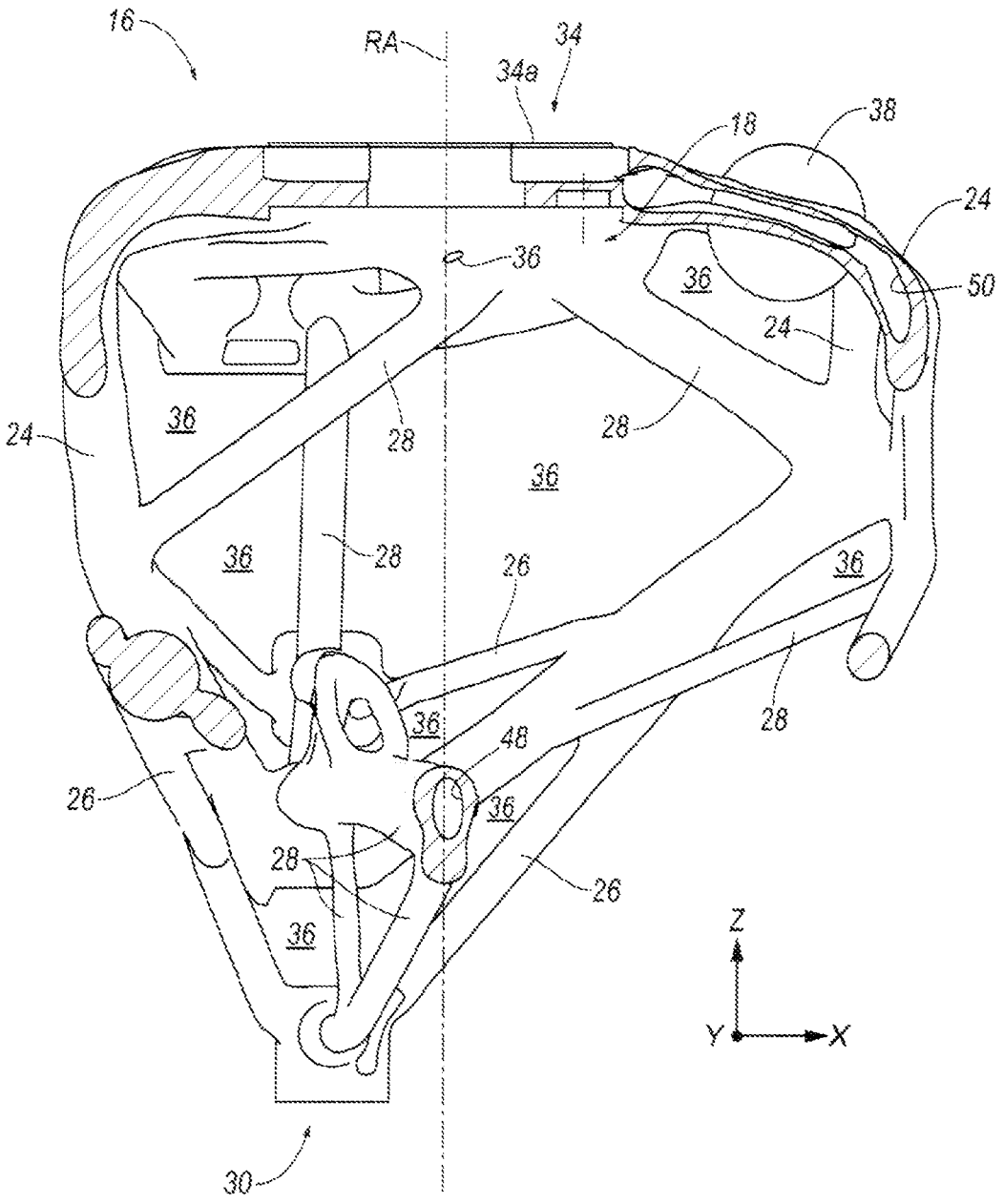
FIG. 7 is a cross-sectional view of the support structure taken along line 7-7 of FIG. 5.

As shown in FIGS. 6 and 7, one or more primary support members 24, one or more secondary support members 26 and one or more tertiary support members 28 may have an internal cavity 44, 46, 48, respectively, that may extend the entire length of the support member 24, 26, 28 to help further reduce the weight of the rotary cutting tool 10 and assist in rotationally balancing the rotary cutting tool 10. In addition, the central hub 18 may also include an internal cavity 50 to further reduce the weight and assist in rotationally balancing the rotary cutting tool 10.

The internal cavities 44, 46, 48 of the support members 24, 26, 28 may define fluid channels that enable fluid to be transported from a fluid entry 52 of the rear machine connection member 22 to the pocket region 30. It should be understood that each pocket region 30 is capable of delivering the fluid to cutting insert/workpiece interface, if desired. However, it should be understood that some internal cavities 44, 46, 48 of the support members 24, 26, 28 are not used to transport fluid, but instead are used to reduce the overall weight of the support structure 16.

As seen in FIGS. 6 and 7, each of the internal cavities 44, 46, 48 that transport fluid may vary in cross-sectional area, depending on the fluid flow necessary to provide a sufficient amount of fluid to the pocket region 30. As a general rule of thumb, a support member 24, 26, 28 with a relatively larger cross-sectional area (i.e., thickness) will have a relatively larger internal cavity portion for reducing the overall weight of the support structure 16. In addition, it will be appreciated that the invention is not limited by the number, size and/or shape of the internal cavities 44, 46, 48, and that the invention can be practiced with one or more internal cavities 44, 46, 48 having any desirable size and shape to reduce the weight of the support structure 16, so long as sufficient fluid flow is provided to the insert/workpiece interface of the cutting insert 32, if desired.

As mentioned above, the geometric arrangement and physical dimensions of the support structure 16 is determined using a topology optimization technique and manufactured using additive manufacturing (i.e., 3D printing). The geometric arrangement and physical dimensions of the support structure 16 depends on the design requirements, such as volume, tilting moment, forces, loads, total mass, and the like, of the rotary cutting tool 10. As a result, each of the plurality of primary support members 24, each of the plurality of secondary support members 26 and each of the plurality of tertiary support members 28 in the illustrated embodiment have different physical dimensions. In addition, the physical dimensions of each primary support member 24, each secondary support member 26 and each tertiary support member 28 varies along its length.

As described above, the rotary cutting tool 10 comprises a support structure 16 having a geometric arrangement and physical dimensions that are determined using a topology optimization technique and manufactured using additive manufacturing (i.e., 3D printing).

The patents and publications referred to herein are hereby incorporated by reference.

Having described presently preferred embodiments the invention may be otherwise embodied within the scope of the appended claims.

What is claimed is:

1. A rotary cutting tool, comprising:
 a support structure comprising:
  a central hub located at an axially rearward end of the rotary cutting tool; and
  a plurality of support members extending in different axial and radial directions in three-dimensional space with respect to a central, rotational axis of the rotary cutting tool; and
  a pocket region supported by one of the plurality of support members;

wherein the plurality of support members comprises a plurality of primary support members, wherein at least one primary support member extends from the central hub to the pocket region;
  wherein the plurality of support members further comprises a plurality of secondary support members, wherein at least one secondary support member extends from one of the plurality of primary support members directly to the pocket region; and
 an adapter connected to the central hub for connecting the support structure to a rear machine connection member,
 wherein the central hub extends in a plane that is substantially perpendicular to the central, rotational axis of the rotary cutting tool.

2. The rotary cutting tool of claim 1, wherein the plurality of support members further comprises a tertiary support member, and wherein the tertiary support member extends from one of the following:
 a) the primary support member to a second primary support member;
 b) the primary support member to a secondary support member;
 c) a secondary support member to a second secondary support member;
 d) the pocket region to a second pocket region;
 e) the primary support member to the central hub;
 f) a second tertiary support member to the pocket region; and
 g) a second tertiary support member to a third tertiary support member.

3. The rotary cutting tool of claim 1, wherein the central hub has an internal cavity.

4. The rotary cutting tool of claim 1, wherein at least one of the plurality of support members has an internal cavity.

5. The rotary cutting tool of claim 4, wherein the internal cavity defines a fluid channel for transporting fluid to a cutting insert.

6. The rotary cutting tool of claim 1, wherein a cross-sectional area of at least one of the plurality of primary support members is greater than a cross-sectional area of at least one of the plurality of secondary support members.

7. The rotary cutting tool of claim 1, wherein the support structure is asymmetric with respect to the central, rotational axis of the rotary cutting tool.

8. The rotary cutting tool of claim 1, wherein the central hub is asymmetric with respect to the central, rotational axis of the rotary cutting tool.

9. The rotary cutting tool of claim 1, wherein the central hub has one or more voids therethrough.

10. The rotary cutting tool of claim 1, wherein an outer surface of the central hub is non-planar.

11. The rotary cutting tool of claim 1, wherein the rotary cutting tool comprises a rotating boring tool.

12. The rotary cutting tool of claim 1, wherein the support structure further comprises a plurality of pocket regions supported by one or more of the plurality of support members.

13. The rotary cutting tool of claim 12, wherein the plurality of pocket regions comprises two or more rows of pocket regions, wherein a first row of the two or more pocket regions is positioned axially forward relative to a second row of the two or more pocket regions.

14. The rotary cutting tool of claim 12, wherein at least one secondary support member extends from another secondary support member directly to a pocket region of the plurality of pocket regions.

15. The rotary cutting tool of claim 1, wherein the support structure further includes one or more balancing masses for rotationally balancing the support structure about the central, rotational axis of the rotary cutting tool.

16. The rotary cutting tool of claim 1, wherein each of the plurality of support members of the support structure are manufactured using an additive manufacturing process.

17. The rotary cutting tool of claim 1, wherein the support structure further comprises a coupling interface for coupling the support structure to the adapter.

18. The rotary cutting tool of claim 17, wherein the coupling interface is integrally formed with the central hub, the plurality of support members, and the pocket region.

19. The rotary cutting tool of claim 17, wherein the coupling interface comprises a planar outer surface.

* * * * *